June 12, 1934.    M. KNOBEL    1,962,311
RECORDING DEVICE
Filed Feb. 15, 1933    2 Sheets-Sheet 1
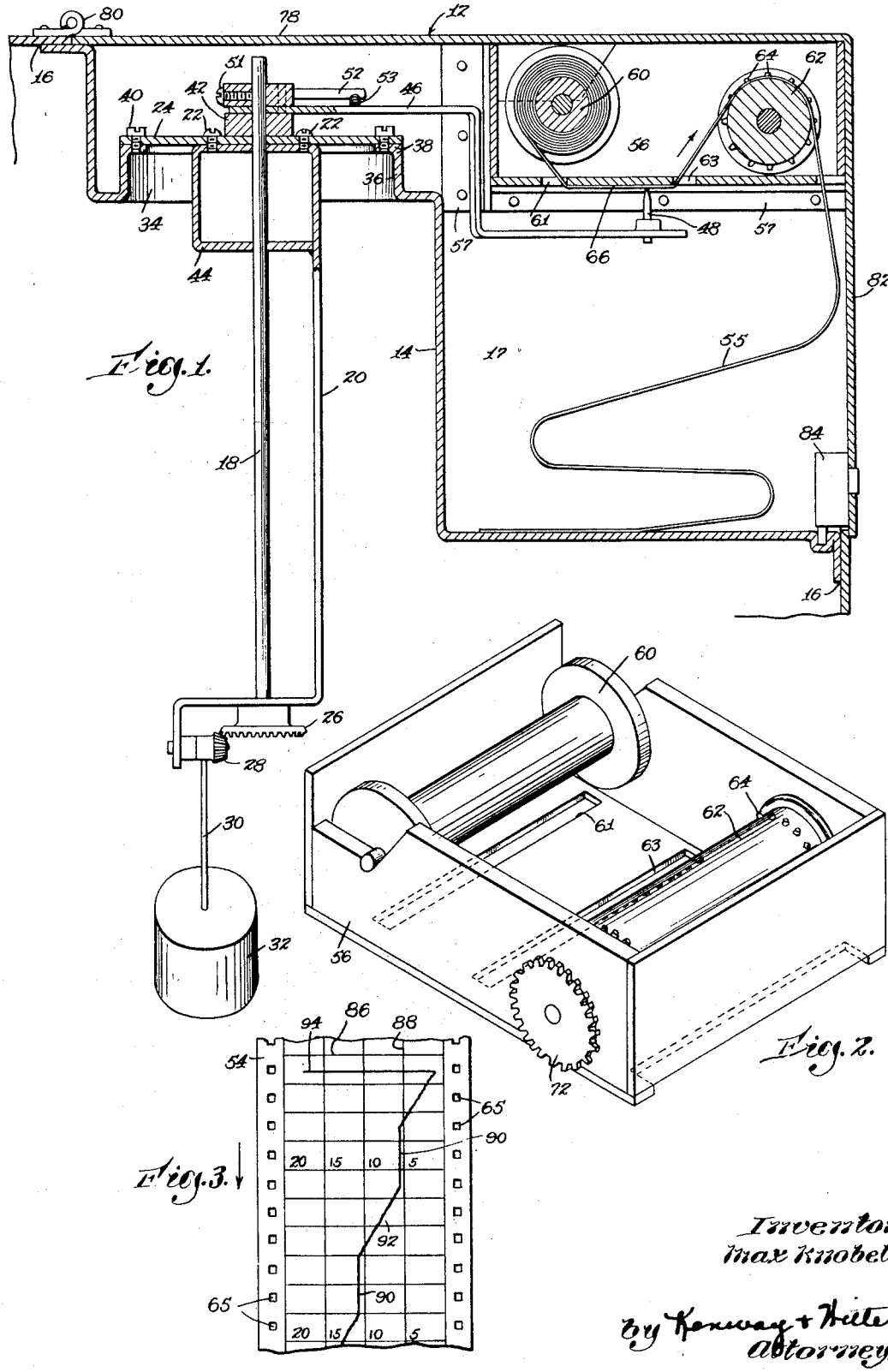
Inventor
Max Knobel
by Kenway + Witter
Attorneys June 12, 1934.  M. KNOBEL  1,962,311
RECORDING DEVICE
Filed Feb. 15, 1933  2 Sheets-Sheet 2
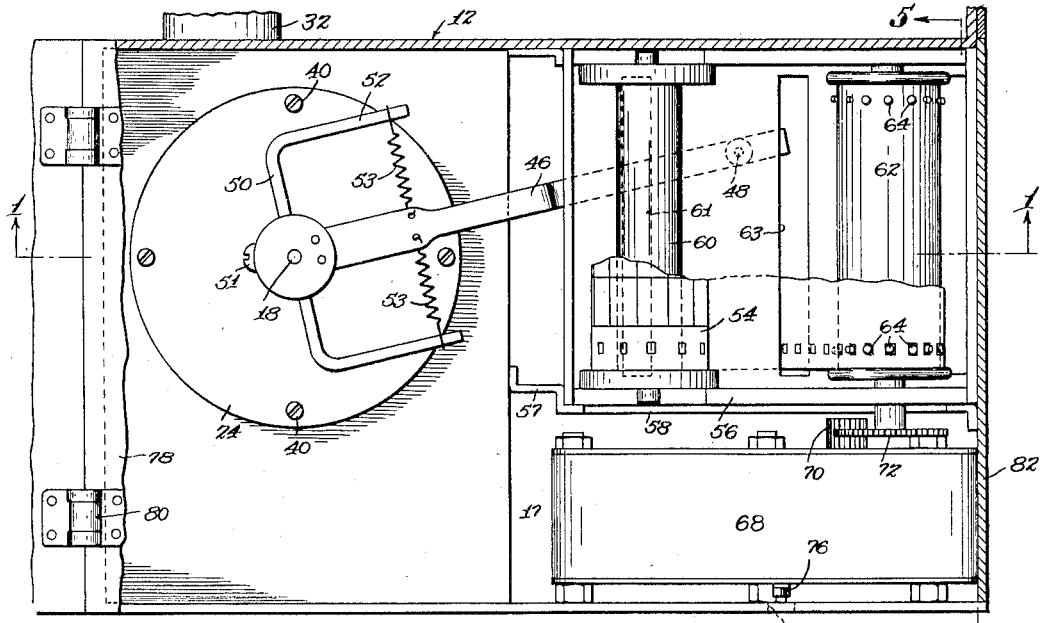
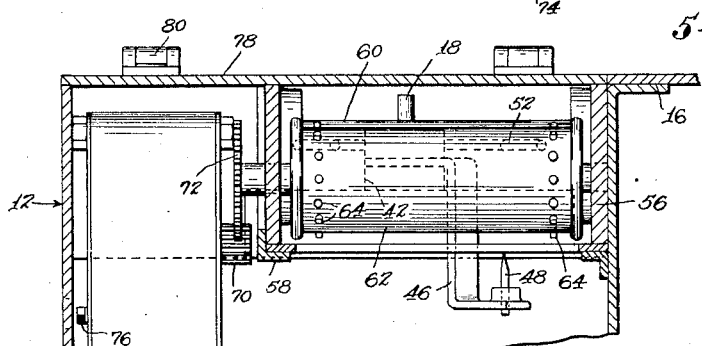
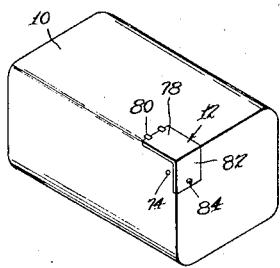
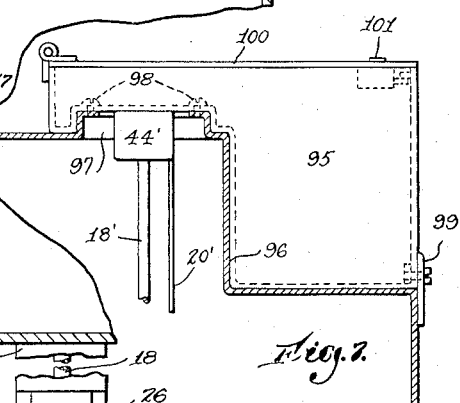
Inventor
Max Knobel
by Kenway & Witter
Attorneys Patented June 12, 1934

1,962,311

UNITED STATES PATENT OFFICE 1,962,311

RECORDING DEVICE

Max Knobel, Arlington, Mass.

Application February 15, 1933, Serial No. 656,838

7 Claims. (Cl. 234—34)

This invention relates to devices for recording continuously the volume of gasoline or other liquid in a tank over a predetermined period of time and is especially applicable for use in connection with motor vehicles. It is well known that serious losses are continually occurring in the use of commercial vehicles due to misrepresentations by the operator relative to the use of gasoline or other liquid fuel. This may occur in various ways, such as by reporting the input of a greater amount of gasoline than is actually delivered to the tank or by direct theft of gasoline from the tank. Such thefts can be positively detected only by the use of a recording device inaccessible to the operator and designed for making a continuous record of the gasoline in the tank at all times. The device may be such as to show both the amount of gasoline delivered to the tank and the amount withdrawn therefrom, as well as the exact volume at any given time, and it is the primary object of my invention to provide a novel device for recording these conditions with accuracy and facility.

The device of my invention furthermore serves other valuable and useful functions, including the recording of the running or idle condition of the vehicle at all times, the time and time-period of such condition, speed of running, the recording of each trip made and the consumption of fuel and time of such trip. In one aspect, therefore, my invention comprises a novel recording device which will accurately and positively make a continuous record of all these functions, the record and device, of course, being under lock and key and, therefore, inaccessible to the operator.

My invention is especially concerned with the development of a relatively simple, economical and convenient device for performing the above related functions. In its preferred form, the device is directly associated with the fuel tank with which it is used and is preferably mounted within an open chamber formed within the exterior outline of the tank, thus better protecting the device against damage and rendering the same substantially a unit with the tank. A further novel and convenient feature of the invention resides in a unit carrying the record strip, which unit is freely removable for purposes of detaching recorded portions of the strip and refilling with new strip.

These and other features of the invention will be best understood and appreciated from the following description of a preferred embodiment thereof, selected for purposes of illustration and shown in the accompanying drawings, in which Fig. 1 is a vertical sectional view, on line 1—1 of Fig. 4, through a fuel tank and my improved recording device mounted thereon;

Fig. 2 is a perspective view of the removable record-carrying unit;

Fig. 3 shows a fragmentary portion of the record strip;

Fig. 4 is a plan view of the device, the cover being broken away;

Fig. 5 is a sectional view taken on line 5—5 of Fig. 4; and

Fig. 6 is a perspective view of a fuel tank equipped with my invention; and

Fig. 7 is a fragmentary view illustrating a modified form of the invention.

Referring now more specifically to the drawings, the numeral 10 indicates a fuel tank having my improved recording device 12 mounted thereon and, as illustrated, within the general outline of the tank. It will be understood that thus mounting the device within the outline of the tank renders the combination more compact and more pleasing in appearance and better protects the same against possible damage. Provision for this mounting may be made by providing the tank with an inserted inner wall 14 forming a liquid-tight joint at the contacting edges 16, thus leaving an open chamber 17 for reception of the device within the exterior outline of the tank.

The recording device comprises a shaft 18 extending through the top wall 14 vertically into the tank. The shaft is carried by a downwardly-extending bracket 20 hung by screws 22 to a cover member 24. A gear 26 on the bottom end of the shaft is in mesh with a pinion 28, to which is connected an arm 30, and a float 32 is carried on the free end of the arm. Vertical movement of the float, caused by variations in the level of the liquid in the tank, is adapted to rotate the shaft 18.

An opening 34 is provided in the wall 14 of a size sufficient to permit the passage of the float unit therethrough and an upwardly-extending bushing 36, flanged inwardly at 38, is secured to the wall about the opening. The cover member 24 which carries the float unit is tightly secured to the bushing by screws 40. The shaft extends through a close fitting hole in the cover member 24 and a bushing or gasket 42 is provided thereabove to aid in preventing the escape of fuel. A closed housing 44, hung from the bottom surface of the cover member and receiving the shaft therethrough, provides an air chamber preventing the splashing of fuel around the shaft opening through the cover member. It will be clear that the entire float unit may be conveniently assembled within and removed from the tank merely by manipulating the screws 40.

A recording arm 46, having an upwardly-extending recording element 48 at its free end, is carried for movement with the shaft 18 but is preferably so attached to the shaft that minor rotary vibrations of the shaft will not be transmitted to the arm. The arm extends loosely over the shaft and rests on the bushing 42. A yoke 50, fixed to the shaft by a screw 51, carries two fingers 52 extending respectively to opposite sides of the arm. Resilient means, such as light springs 53, connect the fingers to the arm. This arrangement provides a damping means preventing small vibrations of the shaft, caused by splashing movement of the liquid in the tank, from being transmitted to the element 48.

The recording is preferably made on a strip 54 of sensitized paper or the like and the record-holding means is preferably carried as a unit in a housing 56 of any suitable construction and herein illustrated as of box-like form. Bracket supports 57 are provided on the side walls of the open chamber 17 for receiving and supporting the housing in proper position, as shown in Figs. 1 and 5. The record strip supply may be carried on a roll 60 supported by and freely removable from the housing, and the strip may be fed by a feeding roll 62 provided with teeth 64 for engaging within perforations 65 in the strip. In passing from the roll 60 to the roll 62, the strip extends through a slot 61, over a surface at 66, which serves as a recording platen, and back through a slot 63. When the unit 56 is placed on the supports 57, the strip portion on the platen 66 comes into contact with the element 48 which, due to a slight resiliency in the arm 46, rides lightly on the strip and records its movements thereon.

The roll 62 is adapted to be driven chronologically by a spring motor 68, also mounted within the chamber 17 and having a pinion 70 with which meshes a gear 72 on the feed roll shaft, the gear 72 being freely removable with the unit 56. The motor may be wound up by extending a key through an opening 74 and onto a winding stud 76. The device may be protected against damage and unauthorized access thereto by a cover having a horizontal portion 78 pivoted to the tank at 80 and a vertical portion 82, whereby preferably to enclose the entire chamber 17. A key-operated lock 84 is provided for the cover.

The strip 54 is preferably graduated longitudinally by lines 86 spaced one-quarter inch apart, the spaces between such adjacent lines representing one hour of time each. The strip is also graduated transversely by lines 88, representing the volume of fuel in gallons. The strip moves in the direction of the arrow (Figs. 1 and 3) and the straight portions 90 of the recorded line indicate the time when the vehicle was idle, and the sloping irregular portions 92 indicate the time when the vehicle was traveling and using fuel. The time and time duration of each of these portions are accurately indicated and, furthermore, each sloping portion representing a trip and the time and fuel used on such trip are clearly shown. The horizontal line 94 at the top of the strip in Fig. 3 indicates the depositing of fuel into the tank, the amount and time thereof being clearly recorded.

It is believed that the operation and useful functions of the device, as well as the advantages of the construction illustrated, will now be clearly understood and appreciated. The strip is continuously driven chronologically by the spring motor 68 and when the vehicle is idle the recorded line on the strip will extend longitudinally of and parallel with the strip, as at 90, it being understood that the vehicle is at rest and no fuel is being used. When the vehicle is running, the recorded line will slant to the right, as at 92 (Fig. 3), thus showing consumption of fuel. Each of line portions 90 and 92 show a definite period of time, as indicated by the graduations 86, and each sloping line 92 furthermore represents a trip and shows definitely the volume of fuel used and the time and time period of the trip. Any delivery of fuel into the tank is furthermore shown by a horizontal line 94. The device is more particularly adapted to be used on trucks, taxicabs and other commercial vehicles, and the use of a relatively long rolled record strip, as disclosed herein, permits the records to be collected and the device to be reloaded at the end of relatively long periods, such as a week, each collected strip being an accurate record of the fuel consumption and related time elements for its vehicle for the previous week.

In removing the recorded portion 55 of the strip, the lock 84 is released and the cover 78—82 is lifted. The unit 56 is then removed bodily along with the recorded portion 55 of the strip, which portion has been housed within the chamber 17 as shown in Fig. 1. The strip 54 is then advanced sufficiently to bring the recorded portion 55 beyond the feed roll 62, which portion is then torn off and the unit replaced. Should it become necessary to repair or replace the float or any part thereof, the entire float unit can be conveniently taken from the tank merely by removing the screws 40.

It will be understood that the invention can be considerably modified without departing from the spirit thereof. For example, in Fig. 7 I have illustrated the entire recording device as mounted on and within a housing 95, which housing is at least partially received within an open chamber 96 formed within the exterior outline of the tank. The housing serves as a cover member for the opening 97 and is secured in place thereover by screws 98, the housing being also supported by a clamp 99. A cover 100 on the housing is provided with a lock 101. The operating mechanism within and supported by the housing of Fig. 7 is substantially the same as that shown in Fig. 1 and it will be understood that the entire mechanism, including the float, may be removed from the tank bodily with the housing 95.

Having thus described my invention, what I claim as new and desire to secure by Letters Patent is:

1. In combination with a liquid fuel tank, a shaft extending through the top wall vertically into the tank, a laterally-extending arm on the top end of the shaft, an outwardly-directed recording element carried on the free end of the arm, a removable unit having a platen and a paper strip extending thereover in such position that the platen-engaging portion of the strip contacts with said element when the unit is seated in place, a chronological motor for feeding the strip longitudinally, a float in the tank, and connections therefrom to the shaft for rotating the shaft and moving the element transversely of the strip in accordance with the vertical movements of the float.

2. The combination set forth in claim 1, including damping means so connecting the arm to the shaft that minor rotary vibrations of the shaft are not transmitted to the arm.

3. The combination set forth in claim 1, including a yoke fixed to the shaft and having portions thereof disposed on opposite sides of the arm and connected to the arm by resilient means, the arm being otherwise loose on the shaft.

4. In combination with a liquid fuel tank having an open chamber formed within the general exterior outline thereof, a recording device mounted on the tank within said chamber and comprising means for supporting and feeding a record chronologically, a recording element engaging the record, a float in the tank, connections from the float to the element for positioning the element transversely of the record movement in accordance with the vertical positions of the float, a movable cover on the tank extending over the chamber and substantially in alignment with said outline of the tank when in closed position whereby to render the device inaccessible in such position, and a releasable lock for retaining the cover in said position.

5. In combination with a liquid fuel tank having an opening thereinto, a cover for the opening, a float unit hung from the inner wall of the cover and comprising a float within the tank and an element operated by the float and extending outwardly of the tank through the cover, means for supporting and feeding a record chronologically, a recording element engaging the record, and means connecting the two said elements for positioning the recording element transversely of the record movement in accordance with the vertical positions of the float.

6. In combination with a liquid fuel tank having an opening thereinto, a housing removably mounted on the tank and covering the opening, a float unit carried by the housing and comprising a float within the tank and an element operated by the float and extending outwardly of the tank through the opening and into the housing, means within the housing for supporting and feeding a record chronologically, a recording element engaging the record, and means connecting the two said elements for positioning the recording element transversely of the record movement in accordance with the vertical positions of the float.

7. In combination with a liquid fuel tank, a recording device mounted on the tank and adapted to be locked against unauthorized access thereto, said device comprising a platen, a paper strip extending over the platen, means for supporting the supply end portion of the strip, means including a chronological motor for feeding the strip longitudinally, a recording element engaging the strip on the platen, a float in the tank, connections from the float to the element for positioning the element transversely of the strip in accordance with the vertical positions of the float, means providing a chamber for receiving the fed end portion of the strip, and a removable housing supporting the platen, strip and first-named means and rendering the same removable as a unit.

MAX KNOBEL.